United States Patent

[11] 3,627,340

| [72] | Inventor | John E. Shippey |
| | | 2711 Dunn Ave., Jacksonville, Fla. 32218 |
| [21] | Appl. No. | 856,670 |
| [22] | Filed | Sept. 10, 1969 |
| [45] | Patented | Dec. 14, 1971 |

[54] TRANSPORTING SYSTEM
8 Claims, 6 Drawing Figs.

[52] U.S. Cl. ..................................................... 280/5,
280/125, 280/418, 214/38 CA
[51] Int. Cl. ............................................................ B60p 3/22
[50] Field of Search ............................................ 280/5 R, 5
E, 5 C, 47.13, 418, 125

[56] References Cited
UNITED STATES PATENTS

| 2,967,057 | 1/1961 | Meyer | 280/5 E |
| 3,102,738 | 9/1963 | De Roshia | 280/415 |
| 3,105,698 | 10/1963 | Bonarrigo | 280/47.13 |

FOREIGN PATENTS

| 329,969 | 5/1958 | Switzerland | 280/5 E |

*Primary Examiner*—Leo Friaglia
*Attorneys*—George H. Baldwin and Arthur G. Yeager ABSTRACT: A system for transporting a cylindrical tank having a circular side and a pair of spaced horizontal legs extending outwardly therefrom including a pair of assemblies, each having a pair of wheels mounted on ends of an axle. Each assembly has a hollow box member positioned above and connected to its axle, the box including a spaced pair of sidewalls extending generally horizontally and vertically with the horizontal portion of each sidewall having a curved upper edge generally conforming to and supporting the tank's circular side adjacent thereto. Each assembly being arranged to engagingly receive between vertical portions of the box sidewalls one of the legs with the same being maintained between the sidewall vertical portions to inhibit relative longitudinal movement of the assemblies with respect to the tank.

PATENTED DEC 14 1971
3,627,340
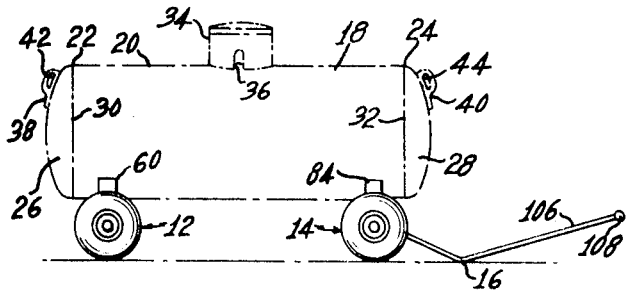
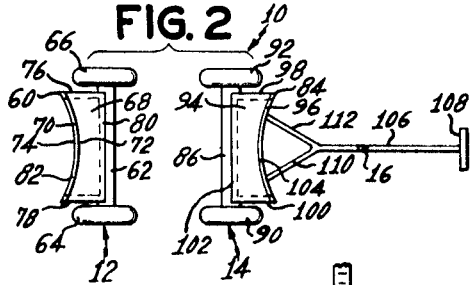
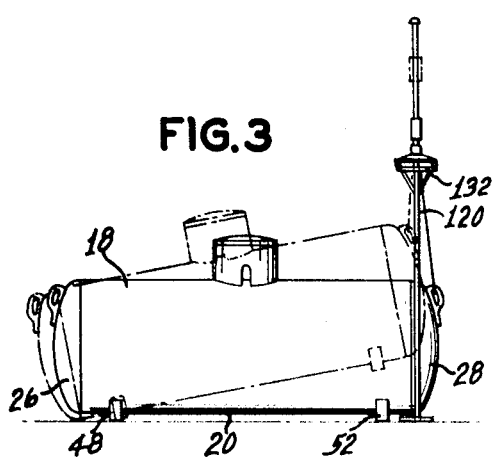
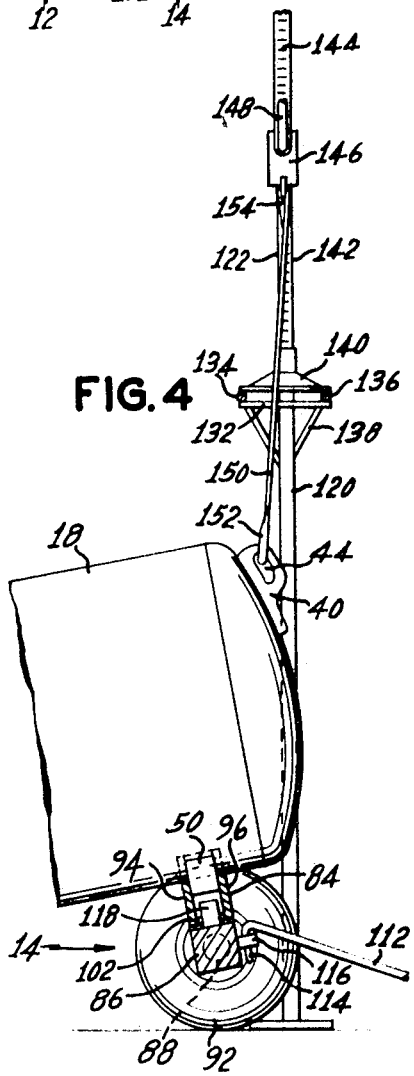
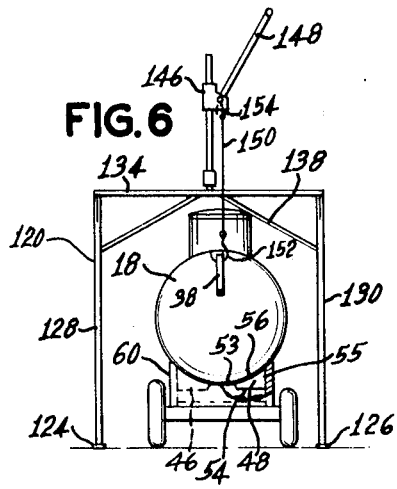
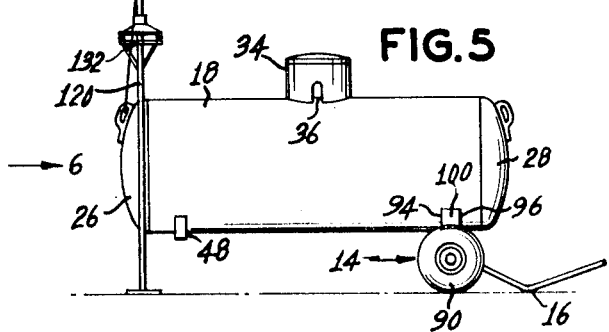
INVENTOR
John E. Shippey
BY
George W. Baldwin
ATTORNEY

TRANSPORTING SYSTEM

BACKGROUND OF THE INVENTION

1. Field of the Invention

This invention relates to an improved transporting system for cylindrical-shaped tanks and other like tanks having a curved surface area, such as tanks used for the holding and storage of liquified petroleum gas, including propane and butane, and which is used as a source of fuel or energy for space-heating, cooking, water heating and the like. More particularly the invention pertains to an improved rolling-type truck or dolly designed primarily for enabling the movement and placement of large, heavy, cylindrical-shaped tanks by a single operator or service man.

2. Description of the Prior Art

Heretofore, four or more service men or operators have been needed and required to move about and position large, heavy weight, cylindrical-shaped tanks from one location to another. Oftentimes large, heavy, cylindrical tanks, of the types with which this invention has particular adaptation and use, such as a liquified petroleum gas tank adapted for storage of butane or propane, have been delivered by truck to the edge of a location or property on which the tank is to be set up and installed, and then removed from the truck bed by powered hoist, lift or the like. Once the tank was on location it took a large number of men to properly position and set the tank in the right and desirable location on the piece of property; at times requiring the use of heavy equipment and the driving of the delivering truck over grass, flowers, bushes and the like and through fences. Frequently it is not possible to position these large tanks at the desired location on the user's property due to the limitations and maneuverability of the truck delivering the same.

While transporting systems, rolling-type trucks, and dollies have been previously devised, such prior art and apparatus devices being generally disclosed in U.S. Pat. Nos. 2,606,039, 3,090,635, 3,093,254, and 3,105,698, each has had certain drawbacks and disadvantages and none has been readily adaptable for the moving about and placement of large, heavy weight, cylindrical shaped tanks by a single service man or operator. Applicant's invention of an improved transporting system, as disclosed herein, is an improvement over such prior art devices as shown for example in the above-mentioned patents.

SUMMARY OF THE INVENTION

It is a general object of this invention to provide an improved transporting system upon and with which large, heavy weight, cylindrical-shaped tanks may be readily transported from place to place as may be required.

Another object of the subject invention is to provide an improved rolling-type truck or transporting dolly for use with large, heavy weight, cylindrical-shaped tanks which will permit easy steering and maneuvering of the tank supported on the truck or dolly.

A further object of the invention is to provide an improved transporting system, dolly or rolling-type truck of simple mechanical construction by means of which a single operator or service man is able to easily maneuver, move about and position a large, heavy, cylindrical tank, moving the same singlehandedly from one location to another with relatively little effort.

In general, these and other objects are attained by providing a system for transporting a large, heavy, elongated tank having side means and a pair of spaced generally horizontal legs extending outwardly from the side means which system includes a pair of assemblies each of which has a pair of wheels rotatably mounted on respective opposite end portions of an axle. Each of the assemblies has a hollow box member positioned above and connected to its axle with each box member having a spaced pair of sidewalls extending generally horizontally and vertically with the horizontal portion of each sidewall having an upper edge generally conforming to and supporting the tank side means adjacent thereto. Each of the assemblies is adapted and arranged to engagingly receive between vertical portions of its box sidewalls one of the tank horizontal legs and maintain the same between the sidewall vertical portions to inhibit relative longitudinal movement of the assemblies with respect to the tank.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a side elevational view showing the improved transporting system of this invention in use with a large cylindrical tank;

FIG. 2 is a top plan view of the two assemblies of the improved transporting system of this invention;

FIG. 3 is a side elevational view showing the preparation of the cylindrical tank for receiving the forward assembly of the improved transporting system of this invention;

FIG. 4 is an enlarged partial side elevational view of an end portion of the cylindrical tank showing the positioning and placement of the forward assembly of the improved transporting system of this invention;

FIG. 5 is a side elevational view showing the preparation of the cylindrical tank for receiving the rearward assembly of the improved transporting system of this invention; and FIG. 6 is a left-hand end view of FIG. 5, looking in the direction of arrow 6, with the rearward assembly of the improved transporting system of this invention being positioned on the cylindrical tank.

DETAILED DESCRIPTION OF THE PREFERRED EMBODIMENT

With detailed reference to the drawing, the improved transporting system 10 for large cylindrical tanks is shown in top view in FIG. 2, and includes a rearward portion or assembly 12 and a forward assembly or component 14. Forward portion 14 of assembly 10 has a handle 16 for pulling, pushing and maneuvering the transporting system or dolly 10 and attached large cylindrical tank 18, such as depicted in FIG. 1.

The tanks, such as tank 18 as depicted in FIGS. 1 and 3, with which the dolly of this invention is usable and adaptable are generally large, heavy in weight (averaging upward to approximately 700–800 pounds), and generally circular in cross section, as can be seen in FIG. 6. Tanks, such as tank 18, are of heavy construction and are designed and fabricated to receive, hold and store many kinds of fluids. Typically, and one of the most common and prevalent usages of a tank of this type is for the receiving, holding and storing of liquified petroleum gas, such as propane or butane, also generally known as bottled gas, under a pressure such that the same remains in the liquified state until it is desired to be used as a source of energy or fuel, such as for space-heating, cooking or water heating.

Tank 18, shown in various figures of the drawing, is specifically designed for the receiving, storage and holding of liquified petroleum gas under pressure, and while the invention disclosed herein will be described in relation thereto, the invention is readily adaptable to and usable in connection with other types of cylindrical tanks having a generally circular cross section which are designed and adopted for other type uses, such as the storage of anhydrous ammonia. Tank 18 includes a central elongated section 20 having a generally circular cross section (see FIG. 6) and having opposite end portions 22 and 24 at respective rearward and forward ends thereof. A pair 26 and 28 of spherical ends are respectively attached to rearward and forward end portions 22 and 24 by respective welds at 30 and 32 to complete tank 18 and completely enclose and seal the hollow within central elongated section 20 of the tank.

Tank 18 is further provided with valves, gauges, regulators and the like (not shown) positioned on and through the top central area of central elongated portion 20 thereof for the filling, emptying and checking of the contents and pressure within the tank. These valves, control gauges, regulators and the like are enclosed within a cylindrical-shaped and capped protective cover 34 which is hinged at one side thereof and may be swung back out of the way to fill the tank, read, inspect, check and manipulate the valves, controls, gauges, regulators and the like positioned therebeneath. Protective cover 34 is provided with an inverted U shaped opening 36 to permit a gas line (not shown) to extend from the valve and controls beneath protective cap 34 and tank 18 to the gas appliance to which tank 18 is supplying gas, while protective cap 34 remains in its closed position as depicted in FIG. 1.

A pair of lifting handles or ears 38 and 40 having respective openings 42 and 44 therein are welded to the upper surfaces of respective spherical end portions 26 and 28. Handles or ears 38 and 40 permit the easy loading and unloading of tank 18 from the bed of a transporting truck by means of a hoist, crane or other like lift means.

Tank 18 is also provided with two sets or pairs of legs or feet which are used for resting and supporting the tank on a surface such as the ground, a concrete apron, bricks or block, and which prevent cylindrical tank 18 from rolling or turning on its circular surface such that protective cap 34 remains upright at the top of tank 18. The pair adjacent end portion 26 include legs or feet 46 and 48, and the pair adjacent end portion 28 include legs or feet 50 and 52, which like legs 46 and 48 are welded to the bottom side of cylindrical shaped tank 18. Legs or feet 46, 48 and 50, 52 of tank 18 are generally of a rectangular shape when tank 18 is viewed from the side, but are of a wedge shape when tank 18 is viewed from the end as depicted in FIG. 6, extending from a point adjacent the center of the tank bottom, as at 53, to a point outward therefrom adjacent the tank side, as at 55. The legs terminate in a generally horizontal or bottom surface, as at 54 (see FIG. 6), and terminate in an upper curved surface, as at 56, generally conforming to the surface shape of cylindrical tank 18.

Transporting system or dolly 10, as has been previously stated, includes a rearward portion 12 and a forward portion 14 having a handle 16 attached thereto. Rearward portion 12 includes a radius box 60, an axle 62 attached to the underside thereof, and a pair of wheels 64 and 66 including large rubber tires which are respectively rotatably attached to the outer opposite end portions of axle 62. The radius box 60 includes a pair of generally parallel and spaced upright sidewall members 68 and 70 which terminate in respective upper curved edges 72 and 74 which generally conform to the curved circular outer surface of cylindrical tank 18. Generally upright sidewalls 68 and 70 are maintained in their spaced-apart position by generally upright end walls 76 and 78 extending therebetween adjacent their outer end portions. Hollow radius box 60 is completed by a generally horizontal bottom 80 extending between and connected to sidewalls 68, 70 and end walls 76, 78, and an open top 82 for the reception thereinto of feet or legs 46 and 48. Forward portion 14 of dolly 10 includes a hollow radius box 84, a lower frame member 86 pivotally attached to radius box 84 at its center, an axle 88 extending through frame member 86, a pair of wheels 90 and 92 including large rubber tires rotatably connected to the outer end portions of axle 88, and handle 16 attached to lower frame member 86. Hollow radius box 84 includes a pair of generally spaced and upright sidewall members 94 and 96 terminating in curved upper edges which generally conform to the curved generally circular outer surface of cylindrical tank 18 and a pair of generally upright spaced end wall members 98 and 100 extending between and connected to sidewall members 94 and 96 adjacent their outer end portions. Hollow radius box 84 is completed by a generally horizontal bottom member 102 extending between and connected to sidewalls 94, 96 and end walls 98, 100, and an open top 104 for the reception thereinto of legs or feet 50 and 52, see FIG. 4. Handle 16 includes a tongue portion 106, a short crossbar 108 for gripping the handle by the hands and a pair of connecting portions 110 and 112 connecting the handle to the forward portion 14 of dolly 10. Handle-connecting portions 110 and 112 include downwardly bent sections, as at 114 in FIG. 4, which extends through openings within tabs, as at 116 in FIG. 4, which are attached to the respective outer end portions of lower pivotal structural member 86 thereby attaching handle 16 to forward portion 14 of the dolly. Tongue portion 106 of handle 16 is attached to connecting portions 110 and 112 in an angularly offset position, as depicted in FIG. 1, to permit easy gripping of cross bar 108 and pulling or pushing of dolly 10 with tank 18 positioned thereon. Lower structural member 86 is pivotally connected at its midportion to the midportion of hollow radius box 84 by a pin 118 extending upward from member 86 through box bottom 102 into the hollow of radius box 84.

In positioning large, heavy weight cylindrical-shaped tanks, such as tank 18, on dolly 10 of this invention the help of an inverted U-shaped frame 120 and a jack 122, or similar lifting device such as a winch, mounted thereon is often needed. Frame 120 includes a pair of feet 124 and 126 which rest on the ground surface and a pair 128 and 130 of generally upright spaced members attached to respective feet 124 and 126. Short members, such as at 132, extend across the top of each upright member 128 and 130, and a pair 134 and 136 of generally horizontal elongated crossmembers extend between short members 132 at the top of upright members 128 and 130. Inverted U-shaped frame 120 is completed by appropriate bracing member such as at 138.

Jack 122 is attached to the top center portion of generally horizontal elongated crossmembers 134 and 136. The jack 122 includes a base member 140 attached to crossmembers 134 and 136, and an upright post 142 with ratchet notches 144 positioned on one of its sides which engagingly fits within base 140. An operating block 146 which is manipulated by handle 148 is positioned on upright post 142 and engages ratchet notches 144 and is moved upward or downward therealong by handle 148. A short cable 150 having a pair of hooks 152 and 154 respectively attached to its opposite end portions is provided and extends between operating block 146 of jack 122 and one of lifting handles or ears 38 or 40, of tank 18, such as depicted in FIG. 4.

In using transporting system 10 and placing tank 18 thereon, assemblies 12 and 14 thereof need to be positioned beneath tank 18 with the same resting thereon and in engagement therewith. To accomplish this, one end portion, such as end 28 of tank 18 is raised and elevated above the ground surface, as depicted in FIG. 3, by use of frame 120, jack 122 and cable 150, which have been positioned adjacent this end of the tank as depicted in FIGS. 3 and 4. Now forward portion 14 of dolly 10 is positioned under the elevated end 28 of tank 18 such that the pair of legs or feet 50 and 52 are positioned within hollow radius box 84 of portion 14 when tank end is lowered by jack 122. Upon lowering of elevated tank end 28 the under curved surface of cylindrical tank 18 comes to rest upon the upper curved edges of sidewall members 94 and 96 of radius box 84 and the pair of feet 50 and 52 extend downward into the hollow of hollow radius box 84, as depicted in FIG. 4, with the sides thereof closely adjacent the inner sides of sidewalls 94 and 96 of hollow radius box 84. Next the other or opposite end 26 of tank 18 is raised and elevated above the ground surface by means of frame 120, jack 122 and cable 150, which have been positioned adjacent this end 26, all as depicted in FIGS. 5 and 6. When end 26 has been elevated the rear portion or component 12 of dolly 10 is positioned thereunder such that the pair of legs or feet 46 or 48 of tank 18 will fit within and extend downward into the hollow of hollow radius box 60 when this end of the tank is lowered. After end 26 of tank 18 is lowered by means of jack 122, the curved under surface of cylindrical tank 18 will rest upon the upper edges 72 and 74 of respective upright sidewalls 68 and 70 of radius box 60 with the sides of feet 46 and 48 being closely adjacent to the inner sides of upright sidewalls 68 and 70. With tank 18 positioned on and engaged with both rearward 12 and forward 14 components of dolly 10, the same may be readily pulled and pushed about by means of handle 16, with legs 46, 48 within radius box 60 and legs 50, 52 within radius box 84 preventing the movement along and displacement of portions 12 and 14 of dolly 10 from tank 18 such that tank 18 may be properly positioned and located on the users' property, as may be desired. Once tank 18 has been transported by dolly 10 to the selected cite for placement thereof, the reverse of the above steps and procedures are followed to set the tank in location. That is, first one end of tank 18 will be elevated and raised such that one portion or component of the dolly may be removed therefrom and then this end lowered to be positioned on the ground, block or a concrete pad. Next the opposite end of tank 18 will be elevated and raised whereby the other component or portion of dolly 10 may be removed therefrom and then this last end lowered to be set on the ground, block, brick or a concrete apron. Tank 18 may then be connected to the utility to which it is to supply gas and subsequently filled with liquified petroleum gas and put in service.

While only a certain preferred embodiment of this invention has been shown and described by way of illustration, many modifications will occur to those skilled in the art and it is intended that all such modifications be included within the true spirit and scope of this invention.

What is claimed as new and what it is desired to secure by Letters Patent of the United States is:

1. A system for transporting a large, heavy, elongated tank, the tank having side means and a pair of spaced generally horizontal legs extending outwardly from said side means, said system comprising a pair of assemblies each of which includes a pair of wheels rotatably mounted on respective opposite end portions of an axle, each assembly having a hollow box member positioned above and connected to its said respective axle, each said box member having a spaced pair of sidewalls extending generally horizontally and vertically, the horizontal portion of each said sidewall having an upper edge generally conforming to and supporting said side means of the tank adjacent thereto, each said assembly being adapted and arranged to freely and engagingly receive between vertical portions of said box sidewalls one said horizontal leg with said side means in engagement with the upper edges of said box sidewalls, said legs being maintained between and detached from said vertical portions with said vertical portions inhibiting relative longitudinal movement of said assemblies with respect to the tank.

2. The system for transporting as defined in claim 1 wherein said tank side means includes a curved bottom portion with said pair of horizontal legs extending outwardly therefrom, the horizontal portion of each said sidewall of each said box member having a curved upper edge generally conforming to and supporting said curved bottom portion of the tank adjacent thereto.

3. The system for transporting as defined in claim 1 wherein said hollow box member of each said assembly further includes a spaced pair of end walls extending between and connected to said pair of box member sidewalls, and an open top for the ingress and egress of said leg respectively into and out of said box member.

4. The system for transporting as defined in claim 1 further including a second pair of spaced generally horizontal legs extending outwardly from said respective side means of the tank, each of said legs of said second pair being in respective alignment with a leg of said first pair of legs, each said assembly being adapted and arranged to engagingly receive between vertical portions of said box sidewalls one leg of each said first and second pair of legs.

5. The system for transporting as defined in claim 1 further including a handle attached to one of said pair of assemblies for pushing and pulling said one assembly thereby moving said assemblies and the tank supported thereon.

6. The system for transporting as defined in claim 1 wherein said axle of one said pair of assemblies is pivotable with respect to said box member in a generally horizontal plane about a generally vertical pivot axis extending between said axle and said box member to turn and steer the tank supported on said assemblies.

7. The system for transporting as defined in claim 6 further including a handle connected to said axle of said one assembly for pushing and pulling said one assembly of said system thereby moving said assemblies and the tank supported thereon.

8. The system for transporting as defined in claim 2 wherein the tank is cylindrical and said curved bottom portion of said tank side means is circular.

* * * * *